(12) United States Patent
Chen et al.

(10) Patent No.: US 7,203,729 B2
(45) Date of Patent: Apr. 10, 2007

(54) METHOD AND APPARATUS FOR A COMMUNICATION NETWORK WITH NODES CAPABLE OF SELECTIVE CLUSTER HEAD OPERATION

(75) Inventors: Priscilla L. Chen, Sunrise, FL (US); Lance E. Hester, Davie, FL (US); Yan Huang, Plantation, FL (US)

(73) Assignee: Motorola Inc., Schaumburg, IL (US)

( * ) Notice: Subject to any disclaimer, the term of this patent is extended or adjusted under 35 U.S.C. 154(b) by 926 days.

(21) Appl. No.: 10/108,109

(22) Filed: Mar. 27, 2002

(65) Prior Publication Data

US 2002/0169846 A1 Nov. 14, 2002

Related U.S. Application Data

(60) Provisional application No. 60/285,165, filed on Apr. 20, 2001.

(51) Int. Cl.
*G06F 15/16* (2006.01)
(52) U.S. Cl. .................. 709/209; 709/208; 709/243
(58) Field of Classification Search ................ 709/209
See application file for complete search history.

(56) References Cited

U.S. PATENT DOCUMENTS

| | | | |
|---|---|---|---|
| 5,850,592 A * | 12/1998 | Ramanathan | 455/7 |
| 5,974,236 A * | 10/1999 | Sherman | 709/221 |
| 6,349,091 B1 | 2/2002 | Li | |
| 6,385,174 B1 * | 5/2002 | Li | 370/252 |
| 6,456,599 B1 * | 9/2002 | Elliott | 370/254 |
| 6,493,759 B1 * | 12/2002 | Passman et al. | 709/227 |
| 2002/0083194 A1 * | 6/2002 | Bak et al. | 709/238 |

OTHER PUBLICATIONS

"Energy-Scalable Algorithms and Protocols for Wireless Microsensor Networks" by Wendi Rabiner Heinzelman, Amit Sinha, Alice Wang, and Anantha P. Chandrakasan, Massachusetts Institute of Technology, 2000 IEEE, pp. 3722-3725.
"Distributed Top-Down Hierarchy Construction" by David G. Thaler and Chinya V. Ravishankar, University of Michigan, 1998 IEEE, pp. 693-701.

\* cited by examiner

*Primary Examiner*—Rupal Dharia
*Assistant Examiner*—Nicholas R Taylor
(74) *Attorney, Agent, or Firm*—Matthew C. Loppnow

(57) ABSTRACT

A communication device (111) determines whether to operate as a cluster head in a network of communication devices (100). The device performs a self-assessment regarding its ability to operate as a cluster head based on a formula that assigns weights to factors related to its capabilities and preferably its environment (410, 420, 430). The ability of the device is combined with a random value component in determining whether to operate as a cluster head (440). In the preferred embodiment, upon assumption of cluster head status, the device communicates with neighboring devices to signal its cluster head status, and to invite others to participate in the formation of a cluster.

15 Claims, 4 Drawing Sheets

METHOD AND APPARATUS FOR A COMMUNICATION NETWORK WITH NODES CAPABLE OF SELECTIVE CLUSTER HEAD OPERATION

CROSS REFERENCE TO RELATED APPLICATIONS

This application is related to the application filed on Apr. 20, 2001 and entitled "Communication Network Utilizing A Cluster Tree Protocol" and assigned Ser. No. 60/285165.

FIELD OF THE INVENTION

The present invention relates generally to communication networks and more specifically to cluster head selection for networks having organized clusters of nodes.

BACKGROUND OF THE INVENTION

Wireless networks are often organized into a two-tier architecture to facilitate management of large numbers of participating communication devices generally referred to as nodes. In a typical setup, the nodes are grouped into clusters based on geographic proximity or other shared characteristics. One node within each cluster is designated as a cluster head for performing certain administrative tasks or for streamlining communications. For example, the cluster head may have the responsibility for data aggregation, data routing, decision-making, and operational control for network devices within the cluster. The cluster head may be manually assigned during initial network configuration, as is the case of a cellular network in which base stations function as cluster heads for mobile subscriber devices. A cluster head may also be dynamically assigned based on a network operation protocol.

Recently, self-organizing, asynchronous wireless networks of heterogeneous devices have been proposed. Nodes within these networks may differ substantially in capabilities and function. Traditional approaches for designating cluster heads have proven inadequate, as certain underlying assumptions such as homogeneity of devices, or manual assignments based on apriori knowledge of node placements and node capabilities, may not be applicable. Thus, a new approach to cluster formation and cluster head selection is needed, particularly, one that is well suited for self-organizing, asynchronous heterogeneous networks.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

The present invention provides a method for forming and operating a wireless network, and particularly, a method of selecting cluster heads from among communication devices of the wireless network. Characteristics of a communication device, such as processing power, available energy, connectivity to other devices, and/or others, are factors in determining suitability for the communication device to operate as a cluster head. Preferably, a device performs a self-assessment regarding its ability level to operate as a cluster head based on a formula that assigns weights to each of the factors. Ordinarily, a device with a higher ability level is more desirable for selection as cluster head. As several devices may have a suitable ability level, the method includes the use of randomization in the cluster head determination process such that a device with a higher ability level is more likely to be selected as a cluster head. Upon assumption of cluster head status, the cluster head device communicates with neighboring devices to signal its cluster head status, to invite others to participate in the formation of a cluster.

Figure 1:
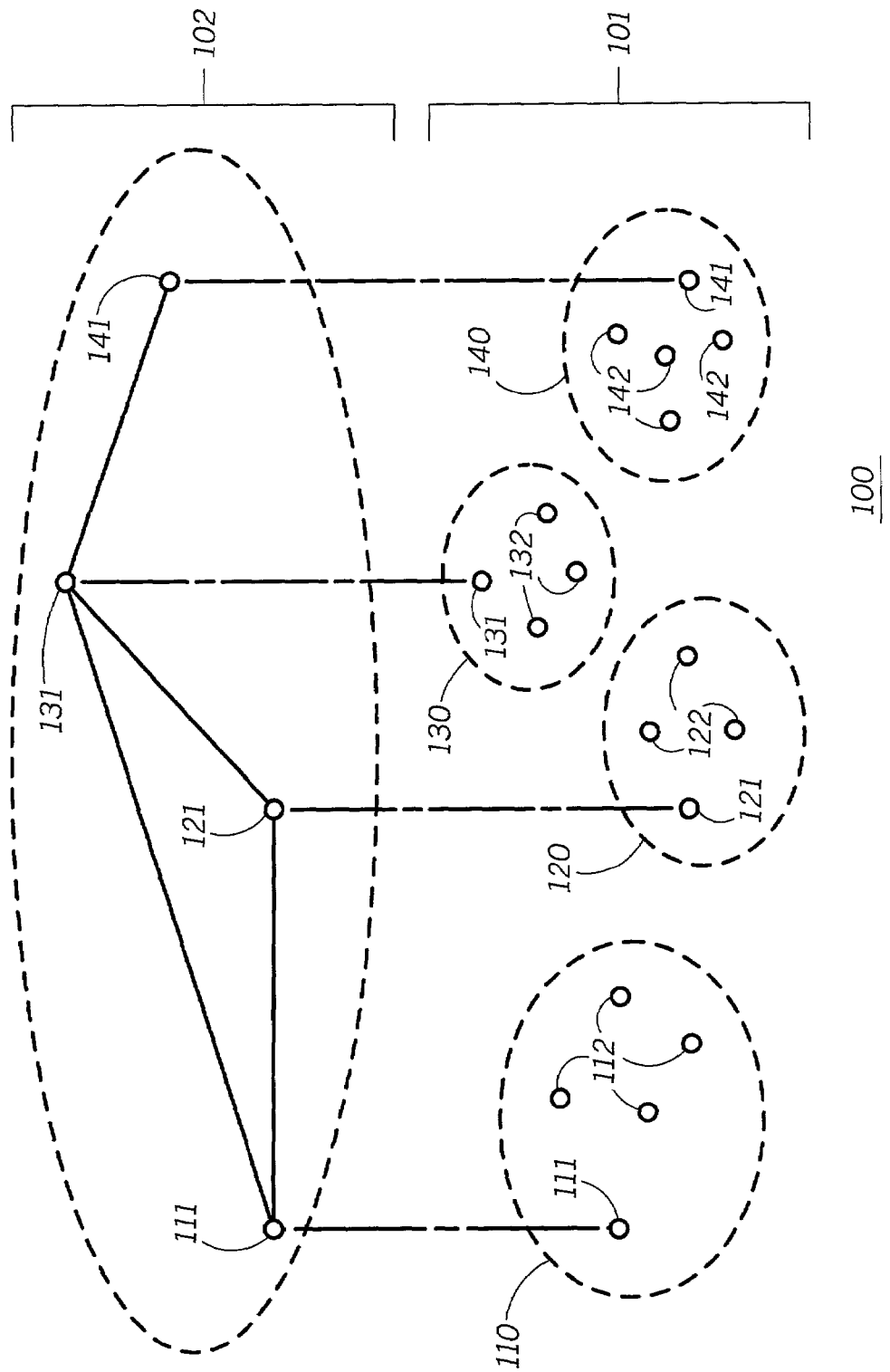
FIG. 1 is a diagram illustrating an exemplary network having identified cluster heads and a two-tier organization, in accordance with the present invention.

FIG. 1 is a diagram illustrating a wireless network 100, in accordance with the present invention. The wireless network 100 has a two-tier organization and includes several communication devices 111, 112, 121, 122, 131, 132, 141, 142, referred to herein as nodes, which are organized into clusters 110, 120, 130, 140. In the preferred embodiment, the clusters are formed by nodes that in general, are in the same geographic region, can successfully communicate with one another, and that share other characteristics such as communication channel, transmission frequency, or the like. The clusters 110, 120, 130, 140 in the aggregate form a first tier 101 of the network in a conceptual hierarchical arrangement. Each cluster 110, 120, 130, 140 has a designated cluster head 111, 121, 131, 141 that perform certain functions such as data aggregation, data routing, decision-making, and operational control for devices within the cluster. For example, the cluster head may act as a conduit for information communicated between a node in the cluster and an external entity. The cluster heads 111, 121, 131, 141 communicate with each other and form a second tier 102 of the network. This second tier 102 might be characterized by higher level or priority communications, separate communication channels, higher data rate, higher transmit power, and the like. The second tier network 102 facilitates communication among nodes in different clusters, and supports external access and control.

Figure 2:
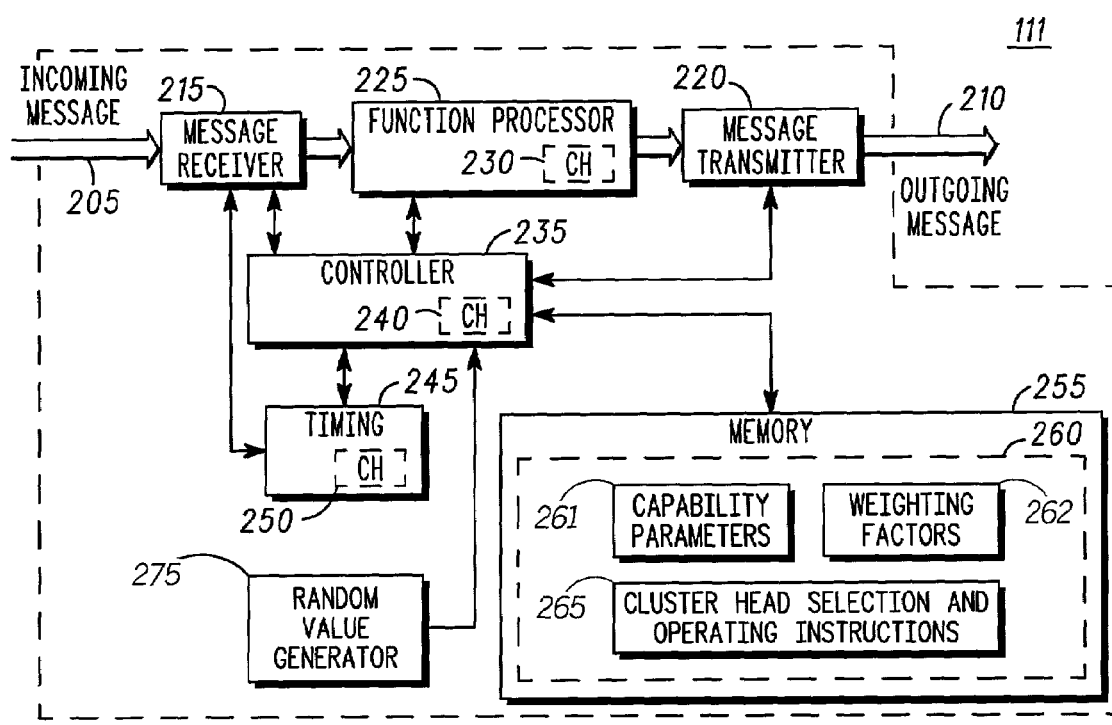
FIG. 2 is a block diagram of a typical network device capable of functioning as a cluster head, in accordance with the present invention.

FIG. 2 shows a system level block diagram of network communication node device 111, which is representative of the communication devices described with respect to FIG. 1. In the network device 111, a message receiver 215 receives incoming messages 205 and provides information to a function processor 225. The function processor 225 includes components particular to the overall function of the device, such as components for sensing, measuring, monitoring, control, and/or other functions. A message transmitter 220, coupled to the function processor 225, provides the capability of transmitting data pertaining to device function or other communication requirements as needed. A timing module 245 provides information for communication, synchronization, and other device functions. A memory module 255 stores operating instructions and data for the device, and a controller 235 provides overall control for the device. A random value generator 275 provides the controller 235 with a random number from zero (0) to one (1) in a uniform distribution. According to the preferred embodiment, cluster heads are selected from among nodes using an algorithm executed at each of these nodes, i.e., each of such nodes determines whether to operate as a cluster head. When a cluster head is selected from among a group of nodes, other nodes within the group self-organize around the cluster head to form a cluster. Accordingly, the device 130 also includes components or functionality specifically for supporting cluster head (CH) activities. For example, the function processor 225, the controller 235, the timing module 245, and the memory module 255, all contain components 230, 240, 250, 260, specifically geared toward supporting the cluster head functionality. The memory 255 includes capability parameters or factors 261, weighting factors 262, and algorithmic and other instructions 265 for determining cluster head status, and for operating as a cluster head. In the preferred embodiment, the capability parameters include factors specifying available energy, such as remaining battery life, available processing capacity, and state of connectivity of a particular communication node. The state of connectivity refers to the number of other communication nodes within communication range of the potential cluster head node. Other factors, such as energy availability of one or more neighboring communication nodes, the waiting time for establishing a connection with a cluster head, are also included in the device memory 255. The procedures and steps implemented by cluster head selection and operating instructions 265 are described below.

Figure 3:
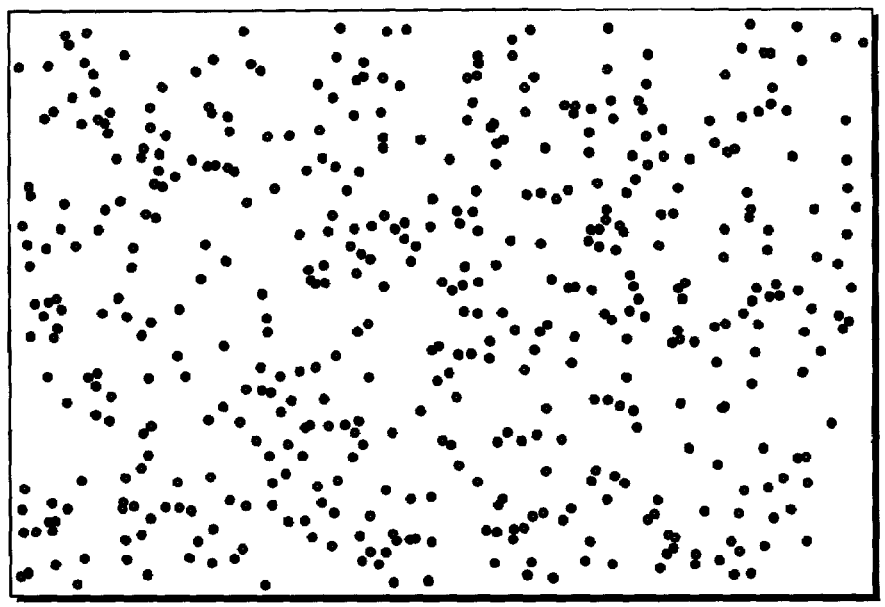
FIG. 3 is a diagram of unorganized nodes, in accordance with the present invention.

FIG. 3 shows an unorganized group of communication devices 300 that are potential nodes in an asynchronous wireless network, in accordance with the present invention. At least some of the communication devices are of the general construction described with respect to FIG. 2, in that they are capable of functioning as cluster heads, although each may have a different capacity to perform such function. As such, the nodes each have configured parameters identifying certain capability factors. Parameters that are more or less static are preprogrammed. Examples include parameters related to overall processing power and the state of access to an external supply. Other parameters, such as available energy from a depletable power source and connectivity, are more dynamic in nature, and are periodically or continuously determined. The network may be in an unorganized state when initially set up or upon a reset.

As discussed earlier, each node has information concerning particular capabilities or attributes considered useful in determining suitability for performing cluster head responsibilities. The capabilities/attributes impacting a node's ability to function as a cluster head are preferably contained in a vector of representative values or capability factors, referred to herein as capability vector C. In one embodiment, vector C contains values representing the node's processing power, available energy, connectivity to other nodes in the network, and waiting time for establishing a connection with a cluster head. In some embodiments, the vector C further includes values representative of the attributes of one or more other nodes. The node preferably includes another vector W having values representing the importance or weight to be attributed to each factor or criteria in the capability vector C. The weight factors or assignments represented by the values of vector W are used by the node in combining the values of the capability vector to obtain an assessment of ability level for operating as a cluster head.

Figure 4:
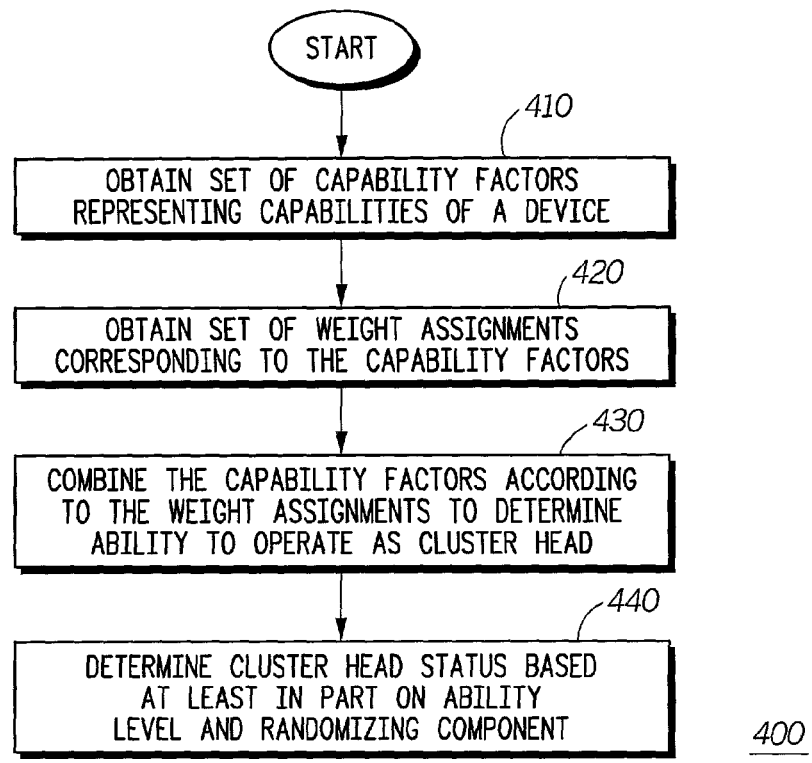
FIG. 4 is a flowchart of procedures used by a node in deciding whether to operate as a cluster head, in accordance with the present invention.

FIG. 4 shows a flowchart of procedures 400 used by a node to determine cluster head status and to organize a cluster, in accordance with the present invention. In a typical operation, each node obtains two or more factors representative of a characteristic of capability of the particular node, and in some cases, that of other neighboring nodes, step 410. Such capability information may be further distributed among neighboring nodes for use in their process in determining cluster head status. Preferably, at least two of the factors are selected from the set of available energy, available processing capacity, state of connectivity of a particular communication node, energy availability of one or more neighboring communication nodes, and waiting time for establishing a connection with a cluster head. A set of weight assignments corresponding to the set of capability values is also obtained, step 420. An assessment is then made of ability level related to the suitability for cluster head operation by combining the set of capability values according to the set of weight assignments, step 430. The node determines whether to operate as a cluster head based on the ability level and based on the use of a random value component, step 440. In the preferred embodiment, a threshold $T_n$ is determined according to the formula:

$$T_n = \frac{(AL_n)(Hd)}{Num_n}$$

where
  n=is the particular node;
  $AL_n$=ability level of the node;
  Hd=average number of cluster heads needed in the network;
  $Num_n$=total number of potential nodes of the same class as the particular node.

The threshold $T_n$ is then compared with a random value to determine cluster head status, i.e., whether or not to operate as a cluster head. In the preferred embodiment, a random value ($X_n$) having uniform distribution from zero (0) to one (1) is obtained. If $T_n$ is greater than or equal to $X_n$, then the node is picked as a cluster head. Otherwise, the node is not picked as a cluster head.

An example will serve to illustrate the described algorithm. Consider a network with 500 randomly placed nodes forming a two-level cluster network. The network is assumed to be random and connected. Depending on the application and the specific devices available in the network, the required number of clusters (and thus the number of cluster heads) will be different. In this example, the number of clusters (and thus cluster heads) needed is assumed to be around one percent (1%) of the total number of network nodes, which in this case is five (5). For demonstration purposes, there are three different kinds of devices in this network. Each of the three kinds of devices has a different capability vector, C, which represents the processing power, available energy, and the connectivity of nodes, C=[Processing Power, Available Energy, Connectivity]

The capability vector for the three different kinds of devices, (C1, C2, C3), are:

$C_1$=[1, 1, 1], $C_2$=[1, 0.5, 0.5], $C_3$=[0, 0.5, 0.5].

For the purposes of this example, the weight on each one of these capabilities are assume to be equal (although in many cases they are different), $$W=[1/16, 1/6, 1/6].$$

The dot product of W and C gives the ability level (AL) for the three different kinds of devices in the network, and thus, $$AL_1=1/2, AL_2=1/3, AL_3=1/6.$$

Assume that of the five hundred (500) nodes in the network, ten percent (10%) of the nodes have the ability level $AL_1=1/2$, fifteen percent (15%) have the ability level $AL_2=1/3$, and seventy-five percent (75%) have the ability level $AL_3=1/6$, and that five (5) cluster heads are needed in the network. Based on the previously described threshold equation, for the first class of devices, $$AL_1=1/2, Hd=5, Num_1=50, \text{ and}$$

$$T_1=(1/2)(5)/50=1/20.$$

For the second class of devices, $$AL_2=1/3, Hd=5, Num_2=75, \text{ and}$$

$$T_3=(1/3)(5)/75=1/45.$$

For the third class of devices, $$AL_3=1/6, Hd=5, aNum_3=375, \text{ and}$$

$$T_3=(1/6)(5)/375=1/450.$$

Figure 5:
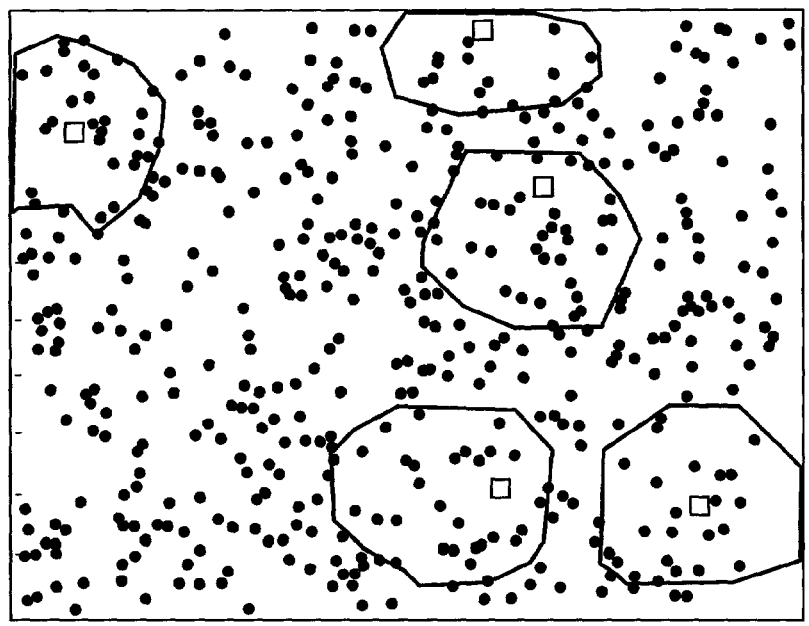
FIG. 5 is a diagram illustrating cluster formation after the selection of a cluster head, in accordance with the present invention.

An analysis of the data will show that, on the average, there will be five (5) nodes chosen as cluster heads, with the higher ability nodes being more likely to be chosen. FIG. 5 shows simulation results for the example described.

Figure 6:
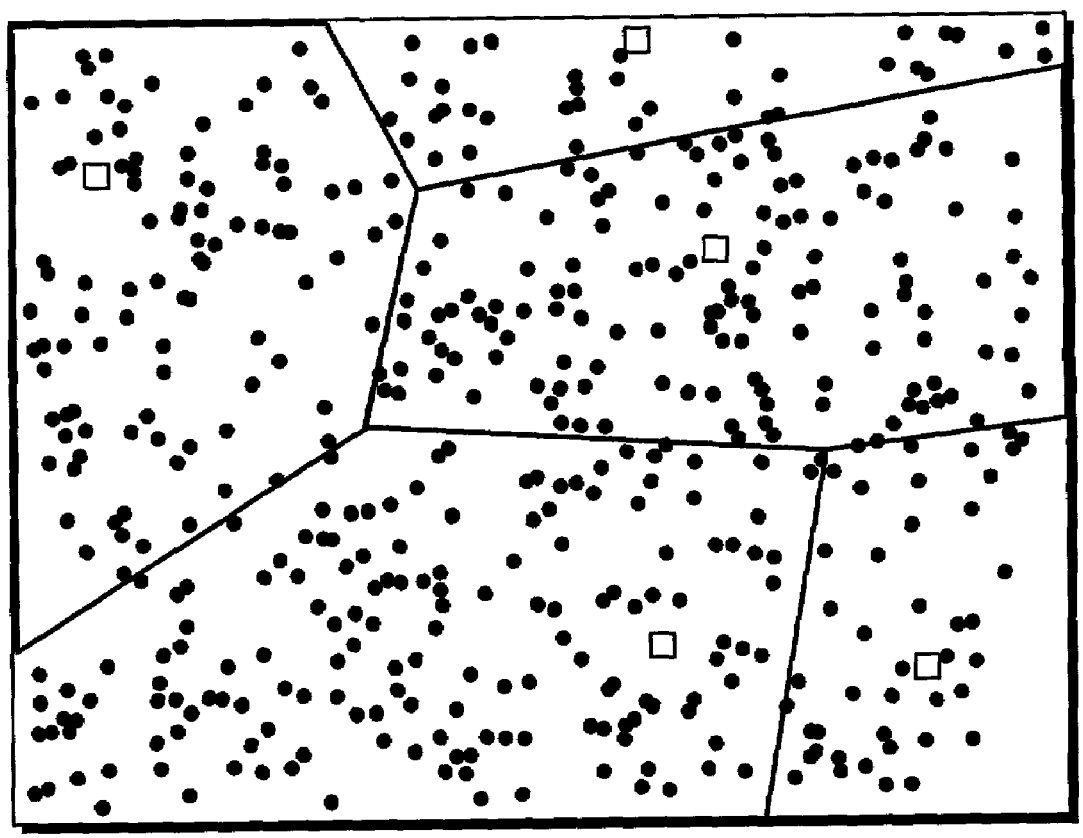
FIG. 6 is a diagram illustrating a latter phase of cluster formation, in accordance with the present invention.

Following cluster head determination, the nodes that are picked as cluster heads advertise their status to their immediate neighbors, i.e., each cluster head communicates with neighboring devices by transmitting a signal identifying the particular node as a cluster head and inviting these neighbors to join in the cluster. Other nodes may also participate in the advertising process. Preferably, nodes that are within the transmission range of a cluster head reply back to the cluster head closest to them, identifying themselves as the first-level nodes of that cluster. These first-level nodes then repeat the process, i.e., advertising their status, and inviting immediate neighbors who have not yet joined a cluster to join their cluster as the next-level nodes of the cluster. This process continues until all the nodes of the network have joined a cluster, or some stopping criteria defined by the network layer is reached. The resulting network will become a multi-hop network, with clusters having multi-layer nodes reporting to the cluster heads. FIG. 5 shows an early stage of network organization around selected cluster heads, and FIG. 6 shows a latter stage network organization around cluster the selected cluster heads, in accordance with the present invention. This cluster head selection process can be restarted or repeated periodically according to the specific protocols of the network.

The present invention provides for significant advantages over the prior art. In the preferred embodiment, cluster head selection is based at least in part on a self-assessment of ability based on device capabilities and relative importance, and based on the incorporation of a randomizing component. In addition, the cluster head selection does not require individual nodes to have a global knowledge of the entire network as each node uses the knowledge of its own capability and other information regarding its immediate neighborhood environment. An additional benefit is the reduction of the number of messages transmitted during the cluster head selection process. Such an approach is well suited for self-organizing, asynchronous wireless networks of heterogeneous devices, among others, particularly when nodes within these networks differ substantially in capabilities and function.

While the above description is of the preferred embodiment of the present invention, it should be appreciated that the invention may be modified, altered, or varied without deviating from the scope and fair meaning of the following claims.

What is claimed is:

1. A method for selecting a cluster head from among a plurality of communication nodes, the method comprising the steps of, at each of the plurality of communication nodes:
   self-initiating a self-assessment of an ability level to operate as a cluster head; obtaining at least two factors representative of a characteristic of at least one of the plurality communication nodes; and
   operating as a cluster head based on an assessment of ability level derived using a formula that assigns weights to each of the at least two factors, and based on use of a random value component.

2. The method of claim 1, wherein the at least two factors are selected from the set of available energy, available processing capacity, and state of connectivity of a particular communication node.

3. The method of claim 2, wherein the at least two factors further comprise a factor related to energy availability of one or more neighboring communication nodes.

4. The method of claim 2, wherein the at least two factors further comprise a factor related to waiting time for establishing a connection with a cluster head.

5. The method of claim 2, wherein the at least two factors comprise at least two values related to available energy, available processing capacity, and state of connectivity for a particular communication node.

6. The method of claim 1, wherein the step of operating as a cluster head comprises the step of communicating to neighboring devices with a signal identifying the particular node as a cluster head.

7. The method of claim 6, wherein the step of operating as a cluster head further comprises the step of forming a cluster comprising neighboring nodes.

8. A communication device for selective operation as a cluster head in a communication network, comprising:
   a transmitter;
   a memory, comprising:
   at least two factors representative of operational characteristics of the communication device;
   operating instructions for self-initiating a self-assessment of ability level based on a formula that assigns different weights to each of the at least two factors in the communication device, and for determining cluster head status based on the ability level assessed; and
   a controller operable to execute the operating instructions in the memory and to cause the transmitter to transmit a signal identifying the communication device as a cluster head in response to a determination of cluster head status.

9. The communication device of claim 8, further comprising a random value generator that operates to output a random value, wherein the controller is operable to execute the operating instructions in a manner that utilizes the random value in determining cluster head status.

10. The communication device of claim 9, wherein the memory farther comprises operating instructions for forming a cluster containing neighboring communication devices.

11. A method for selecting cluster heads from among a plurality of communication devices operating as potential nodes in an asynchronous network, the method comprising the steps of:
  at each potential node of a plurality of potential nodes:
    self-obtaining a set of capability values representing capabilities of the potential node;
    obtaining a set of weight assignments corresponding to the set of capability values;
    obtaining an ability level cite potential node by combining the set of capability values according to the set weight assignments;
    determining cluster head status of the potential node based at least in part on a formula having inputs related to the ability level, a total number of potential nodes, and a total number of desired cluster heads; and
    operating as a cluster head according to the cluster head status.

12. The method of claim 11, wherein the step of obtaining a set of capability values comprises the step of utilizing at least two of available energy, processing capacity, state of connectivity for the potential node, energy availability of one or more neighboring communication nodes, and waiting time for establishing a connection with a cluster head.

13. The method of claim 12, wherein the step of operating as a cluster head comprises the step of communicating to neighboring devices with a signal identifying the potential node as a cluster head.

14. The method of claim 13, wherein the step of operating as a cluster head further comprises the step of fanning a cluster comprising neighboring nodes.

15. The method of claim 14, further comprising the step of utilizing a random value in determining cluster head status.

* * * * *